US012466566B2

(12) United States Patent
John et al.

(10) Patent No.: US 12,466,566 B2
(45) Date of Patent: Nov. 11, 2025

(54) TIME-BASED CONTROL SYSTEM FOR INFLATABLE EVACUATION SLIDE

(71) Applicant: GOODRICH CORPORATION, Charlotte, NC (US)

(72) Inventors: Poly Puthur John, Kerala (IN); Nikhil Anthony Saldanha, Karnataka (IN); Bhavik Mugeraya, Karnataka (IN)

(73) Assignee: GOODRICH CORPORATION, Charlotte, NC (US)

( * ) Notice: Subject to any disclaimer, the term of this patent is extended or adjusted under 35 U.S.C. 154(b) by 936 days.

(21) Appl. No.: 17/676,431

(22) Filed: Feb. 21, 2022

(65) Prior Publication Data

US 2022/0380058 A1 Dec. 1, 2022

(30) Foreign Application Priority Data

May 27, 2021 (IN) .............................. 202141023637

(51) Int. Cl.
*B64D 25/14* (2006.01)
*G05D 7/06* (2006.01)

(52) U.S. Cl.
CPC ........... *B64D 25/14* (2013.01); *G05D 7/0635* (2013.01)

(58) Field of Classification Search
CPC ............................. B64D 25/14; G05D 7/0635
See application file for complete search history.

(56) References Cited

U.S. PATENT DOCUMENTS

| 6,860,205 | B2 | 3/2005 | Baker et al. |
| 8,162,009 | B2 | 4/2012 | Chaffee |
| 8,839,473 | B1 | 9/2014 | Catala |
| 10,640,219 | B2 | 5/2020 | McEwen |
| 10,946,971 | B2* | 3/2021 | John ........................ A62B 1/20 |
| 2020/0094976 | A1* | 3/2020 | John ....................... B64D 25/14 |
| 2020/0182364 | A1* | 6/2020 | Haynes ...................... F04F 5/16 |
| 2021/0053692 | A1* | 2/2021 | Bahena ................... B64D 25/14 |
| 2021/0354835 | A1* | 11/2021 | John ........................ F16K 17/32 |
| 2022/0196181 | A1* | 6/2022 | Saldanha ................ B64D 25/14 |
| 2022/0380058 | A1* | 12/2022 | John ........................ B64D 25/14 |
| 2022/0402618 | A1* | 12/2022 | Palaniappan .......... B64D 45/00 |

FOREIGN PATENT DOCUMENTS

| EP | 3822170 | 5/2021 |
| GB | 2342622 | 4/2000 |

OTHER PUBLICATIONS

European Patent Office, European Search Report dated Oct. 4, 2022 in Application No. 22175441.9.

* cited by examiner

*Primary Examiner* — Gary C Hoge
(74) *Attorney, Agent, or Firm* — SNELL & WILMER L.L.P.

(57) ABSTRACT

An inflation control system for an inflatable may comprise a compressed fluid source, a valve module, a temperature sensor, and a controller. The valve module is connected to the compressed fluid source and configured to control a flow of gas to the inflatable. The temperature sensor measures an ambient temperature and outputs the ambient temperature measurement. The controller is operably coupled to the valve module and configured to receive the ambient temperature measurement and determine an open-valve time based on the ambient temperature measurement, the open-valve time being a duration of time the valve module is in an open position.

15 Claims, 5 Drawing Sheets

TIME-BASED CONTROL SYSTEM FOR INFLATABLE EVACUATION SLIDE

CROSS-REFERENCE TO RELATED APPLICATIONS

This application claims priority to, and the benefit of, India Patent Application No. 202141023637, filed May 27, 2021 and titled "TIME-BASED CONTROL SYSTEM FOR INFLATABLE EVACUATION SLIDE," which is incorporated by reference herein in its entirety for all purposes.

FIELD

The present disclosure relates generally to inflatable evacuation systems and, more particularly, to methods and apparatus used to control inflation of such inflatable evacuation systems.

BACKGROUND

Inflatable evacuation systems may be found on various structures, including aircraft, boats, offshore drilling platforms, and the like. The systems are typically equipped with an inflatable device, such as, for example, an inflatable slide or an inflatable raft, configured to facilitate rapid evacuation of persons in the event of an emergency. The slides or rafts are typically stored in an uninflated condition on the structure—e.g., a commercial aircraft—in a location readily accessible for deployment.

Systems used to inflate the slide or raft typically employ gas stored within a cylinder or tank at high pressure, which is discharged into the inflatable. Due to changes in the densities of gasses caused by variations in temperature, the volume of gas needed to achieve the desired inflation pressure varies with ambient temperature. In this regard, a greater volume of gas is needed to achieve the desired inflatable pressure at low ambient temperatures as compared to the volume of gas needed to achieve the desired pressure at higher ambient temperatures. The volume of gas stored in the pressurized cylinder and provided to the inflatable is configured to ensure that, even at the lowest ambient temperatures, the desired pressure within the inflatable is achieved. Thus, a greater volume of gas than what is needed and/or desired may be provided to the inflatable, particularly at higher ambient temperatures. To prevent over-inflation, current slides and rafts generally include one or more pressure relief valve(s) (PRVs) through which the excess gas may be vented. Some slides and rafts may also include (or may alternatively include) pressure and/or stretch sensors as part of a closed loop system to control the pressure within the inflatable during the inflation process. The PRVs and/or sensors tend to increase manufacturing, packaging, assembly, and/or maintenance requirements for the inflatable.

SUMMARY

An inflation control system for an inflatable is disclosed herein. In accordance with various embodiments, the inflation control system may comprise a compressed fluid source and a valve module connected to the compressed fluid source. The valve control module may be configured to control a flow of gas to the inflatable. A temperature sensor may be configured to measure an ambient temperature and output an ambient temperature measurement. A controller may be operably coupled to the valve module. The controller may be configured to receive the ambient temperature measurement and determine an open-valve time based on the ambient temperature measurement, the open-valve time being a duration of time the valve module is in an open position.

In various embodiments, the controller may be configured to access an open-time versus temperature database. The controller may determine the open-valve time by looking up the ambient temperature measurement in the open-time versus temperature database and determining the open-valve time associated with the ambient temperature measurement.

In various embodiments, the valve module may include a main pneumatic valve configured to start and to stop the flow of gas. In various embodiments, the valve module may include a solenoid control valve connected to the controller and configured to operate the main pneumatic valve. The controller may be configured to energize the solenoid control valve for a length of time equal to the open-valve time. In various embodiments, the solenoid control valve may be a normally open valve.

In various embodiments, the valve module may include a pressure regulator valve. In various embodiments, an aspirator may be fluidly connected between the valve module and the inflatable. The temperature sensor may be mounted to the aspirator.

An evacuation system for an aircraft is also disclosed herein. In accordance with various embodiments, the evacuation system may comprise an inflatable tube and a compressed fluid source fluidly coupled to the inflatable tube. A valve module may be connected to the compressed fluid source and configured to control a flow of gas from the compressed fluid source to the inflatable tube. A temperature sensor may be configured to measure an ambient temperature and output an ambient temperature measurement. A controller may be operably coupled to the valve module. The controller may be configured to receive the ambient temperature measurement from the temperature sensor and determine an open-valve time based on the ambient temperature measurement, the open-valve time being a duration of time the valve module is in an open position.

In various embodiments, the controller may be configured to access an open-time versus temperature database. The controller may determine the open-valve time by looking up the ambient temperature measurement in the open-time versus temperature database and determining the open-valve time associated with the ambient temperature measurement.

In various embodiments, the valve module may include a main pneumatic valve configured to start and to stop the flow of gas from the compressed fluid source to the inflatable tube. In various embodiments, the valve module may include a solenoid control valve operably coupled to the controller and configured to operate the main pneumatic valve. In various embodiments, the controller may be configured to energize the solenoid control valve for a length of time equal to the open-valve time. In various embodiments, the solenoid control valve may be a normally open valve.

In various embodiments, the controller may be configured to start a timer corresponding to the open-valve time. The controller may be configured to de-energize the solenoid control valve in response to expiration of the timer. In various embodiments, an aspirator may be fluidly connected between the valve module and the inflatable tube. The temperature sensor may be mounted to the aspirator.

An article of manufacture including a tangible, non-transitory computer-readable storage medium having instructions stored thereon for controlling inflation of an evacuation slide is also disclosed herein. In accordance with various embodiments, the instructions, in response to execution by a controller, cause the controller to perform operations, which may comprise receiving, by the controller, an ambient temperature measurement; determining, by the controller, an open-valve time based on the ambient temperature measurement; sending, by the controller, a first control signal to a valve module fluidly coupled between a compressed fluid source and the evacuation slide; starting, by the controller, a timer corresponding to the open-valve time; and sending, by the controller, a second control signal to the valve module after expiration of the timer. The first control signal may be configured to cause the valve module to translate from a closed position to an open position. In the open position, gas may flow from the compressed fluid source to the evacuation slide. The second control signal may be configured to cause the valve module to translate from the open position to the closed position. In the closed position, gas from the compressed fluid source may be prevented from flowing into the evacuation slide.

In various embodiments, determining, by the controller, the open-valve time based on the ambient temperature measurement may comprise accessing, by the controller, an open-time versus temperature database.

In various embodiments, sending, by the controller, the first control signal to the valve module may comprise energizing, by the controller, a solenoid control valve, the solenoid control valve being configured to operate a main pneumatic valve.

In various embodiments, the operations may further comprise determining, by the controller, a duration of time to energize the solenoid control valve using the open-time versus temperature database. In various embodiments, the solenoid control valve may be a normally open valve.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

Surface lines may be used throughout the figures to denote different parts but not necessarily to denote the same or different materials. Throughout the present disclosure, like reference numbers denote like elements. Accordingly, elements with like element numbering may be shown in the figures, but may not necessarily be repeated herein for the sake of clarity.

The systems and methods disclosed herein may find particular use in connection with aircraft evacuation slides. However, various aspects of the disclosed systems and methods may be adapted for performance in a variety of other inflatable assemblies, for example, inflatable raft assemblies, and/or any other assemblies having inflatable structures. As such, numerous applications of the present disclosure may be realized.

Figure 1:
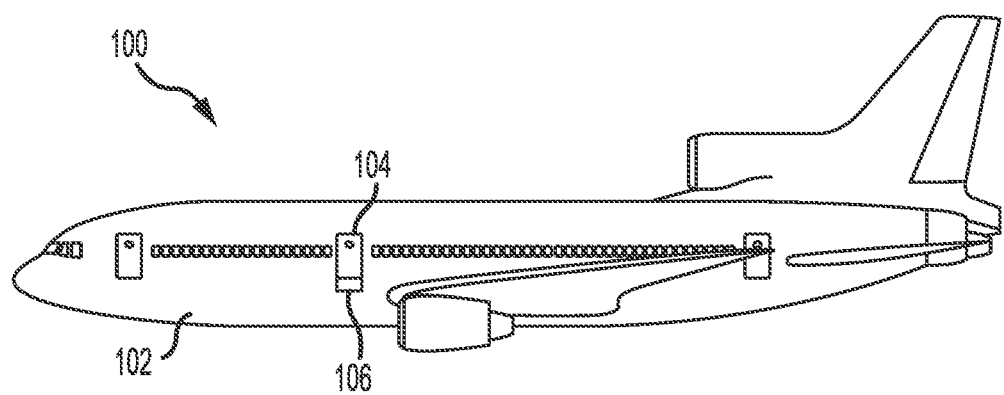
FIG. 1 illustrates an aircraft having an evacuation assembly, in accordance with various embodiments.

Referring now to FIG. 1, an aircraft 100 is shown. Aircraft 100 may include a fuselage 102 having plurality of exit doors, including an exit door 104. Aircraft 100 may include one or more evacuation systems positioned near a corresponding exit door. For example, aircraft 100 includes an evacuation system 106 positioned near exit door 104. In the event of an emergency, exit door 104 may be opened by a passenger or crew member of aircraft 100. In various embodiments, evacuation system 106 may deploy in response to exit door 104 being opened. It is contemplated and understood that evacuation system 106 may deploy in response to other actions taken by a passenger or crew member such as depression of a button, actuation of a lever, or the like.

Figure 2:
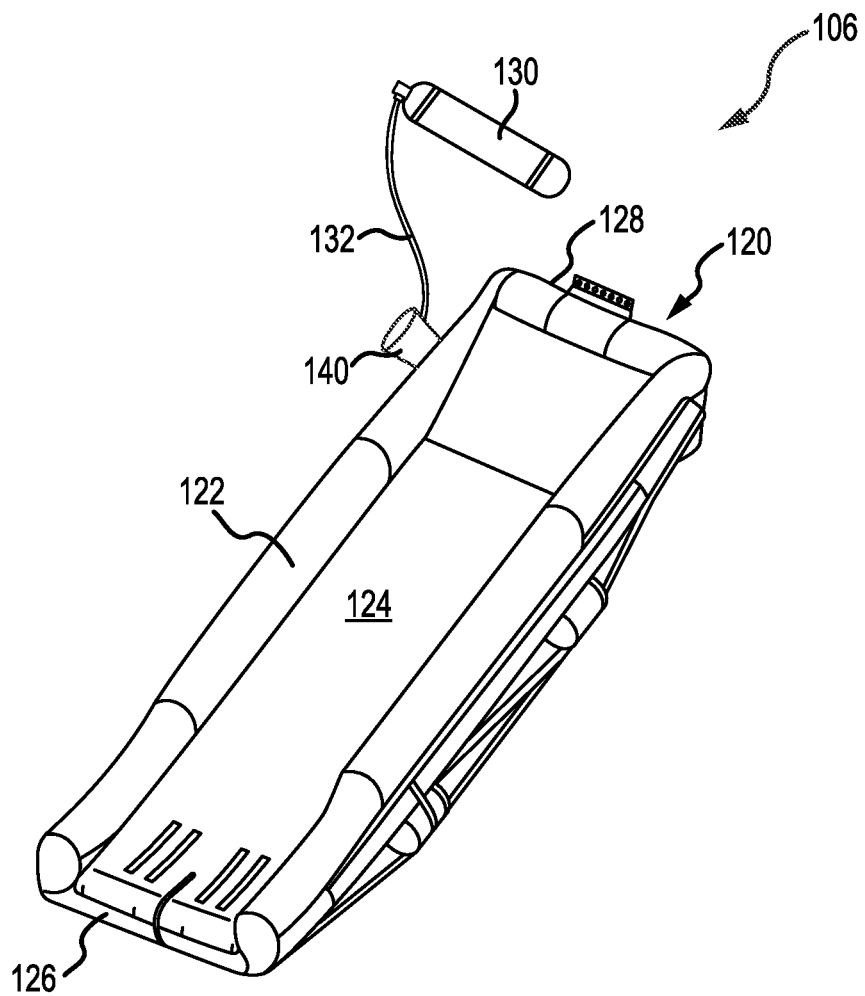
FIG. 2 illustrates an evacuation slide in a deployed position, in accordance with various embodiments.

With reference to FIG. 2, evacuation system 106 is illustrated with the evacuation slide in an inflated or "deployed" position. In accordance with various embodiments, evacuation system 106 includes an evacuation slide 120 and a compressed fluid source 130 configured to deliver a pressurized gas to inflate evacuation slide 120. During deployment, an inflatable tube 122 (or a plurality of inflatable tubes) of evacuation slide 120 is inflated using pressurized gas from compressed fluid source 130. Evacuation slide 120 may comprise a sliding surface 124 secured to the inflatable tube 122 and configured for sliding passenger egress from the emergency exit door 104 of the aircraft 100, with momentary reference to FIG. 1, to a ground surface in the event of an evacuation on land or to a water surface in the event of an evacuation on water. Evacuation slide 120 includes a toe end 126 and a head end 128 opposite toe end 126. Head end 128 may be coupled to an aircraft structure (e.g., fuselage 102 in FIG. 1). Sliding surface 124 extends from head end 128 to toe end 126. Evacuation slide 120 is illustrated as a single lane slide. However, evacuation slide 120 may comprise any number of lanes.

Compressed fluid source 130 is fluidly coupled to evacuation slide 120. For example, compressed fluid source 130 may be fluidly coupled to inflatable tube 122 via a hose, or conduit, 132. In various embodiments, evacuation system 106 may include an aspirator 140 fluidly coupled between compressed fluid source 130 and evacuation slide 120. Aspirator 140 is configured to entrain ambient air with gas output from compressed fluid source 130. For example, in response to deployment of evacuation slide 120, the gas from compressed fluid source 130 flows into aspirator 140 and causes aspirator 140 to draw in ambient air from the environment. The combination of gas flow from compressed fluid source 130 and the environmental gas is then directed into evacuation slide 120, thereby inflating inflatable tube 122.

Figure 3:
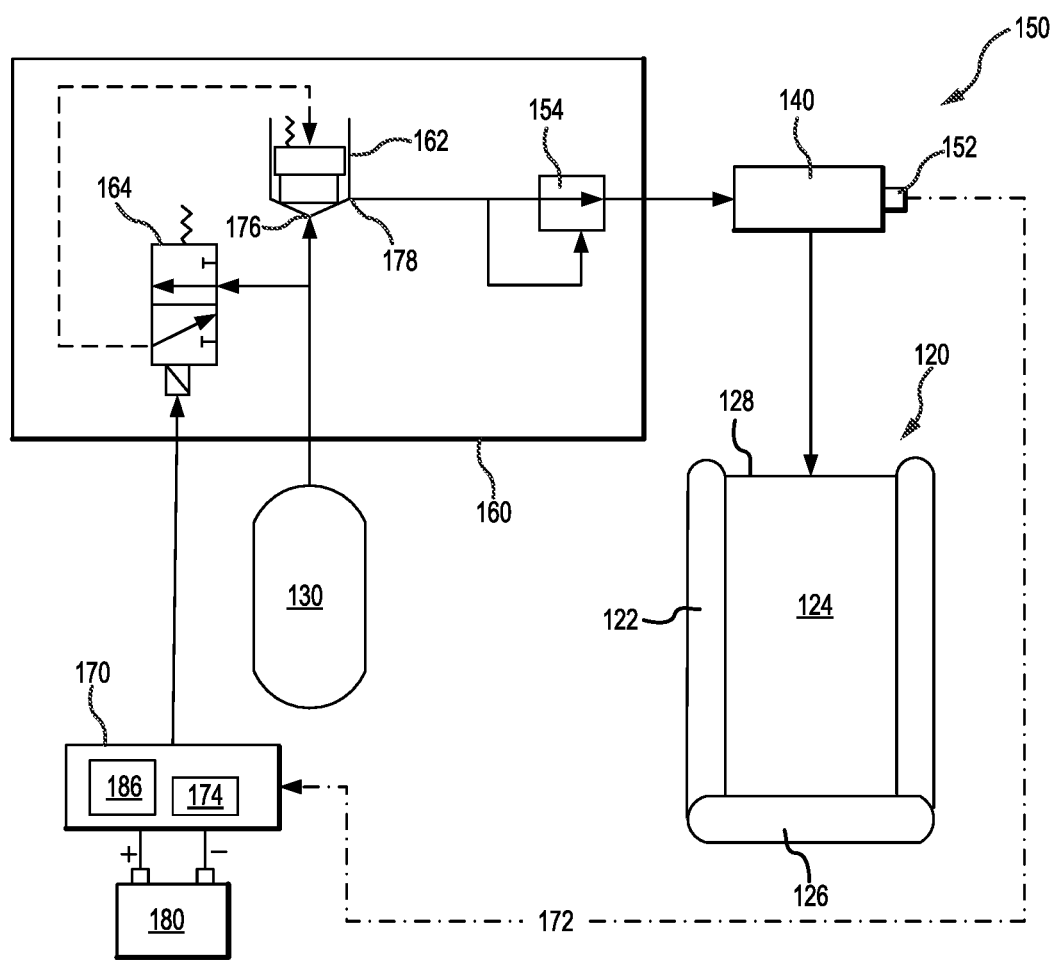
FIG. 3 illustrates a schematic of an inflation control system, in accordance with various embodiments.

Referring now to FIG. 3, an inflation control system 150 for controlling inflation of evacuation slide 120 is illustrated. Inflation control system 150 includes one or more temperature sensor(s) 152 configured to sense or monitor the ambient temperature during the inflation process. As described in further detail below, inflation control system 150 employs real-time temperature data to determine how long (i.e. a duration of time) gas should be provide to evacuation slide 120 to achieve a desired inflation pressure.

Inflation control system 150 includes a valve module 160, compressed fluid source 130, which is filled with a high-pressure gas (or, in various embodiments, a gas generator configured to generate a high-pressure gas), aspirator 140, a controller 170, and a power source 180, such as, for example, a battery or charged capacitor. In various embodiments, the power source 180 is a dedicated source configured to power the temperature sensor 152, as well as each of the valve module 160 and the controller 170. To provide a dedicated source of direct current power, the power source 180 may comprise, for example, a lithium-ion battery or an ultracapacitor, each configured to store energy at a high density for controlling the rapid sequence of events that occur during an inflation process of the evacuation slide 120. As illustrated in FIG. 3, real-time data from the temperature sensor 152 (i.e., ambient temperature measurements) are transmitted to the controller 170 via a temperature sensor bus 172. In various embodiments, the controller 170 may include a general-purpose processor, a digital signal processor (DSP), an application specific integrated circuit (ASIC), a field programmable gate array (FPGA) or some other programmable logic device, discrete gate or transistor logic, discrete hardware components, or any combination thereof. A tangible, non-transitory computer-readable storage medium 174 may be in communication with controller 170. Storage medium 174 may comprise any tangible, non-transitory computer-readable storage medium known in the art. The storage medium 174 has instructions stored thereon that, in response to execution by controller 170, cause controller 170 to perform operations related to controlling the inflation of evacuation slide 120.

In accordance with various embodiments, the valve module 160 is configured to open and close a main pneumatic valve 162 based on a control signal received from the controller 170. More specifically, based on preset control logic and the real-time data received from the temperature sensor 152, controller 170 opens or closes the main pneumatic valve 162 in order to turn on or turn off the flow of high-pressure gas from the compressed fluid source 130 to the inflatable tube 122. In various embodiments, the valve module 160 may further comprise a control valve 164 configured to operate the main pneumatic valve 162 between an open position and a closed position. In various embodiments, the valve module 160 may also include a pressure regulator valve 154 configured to prevent the occurrence of an over-pressure situation at the aspirator 140 or the inflatable tube 122.

Figure 4A:
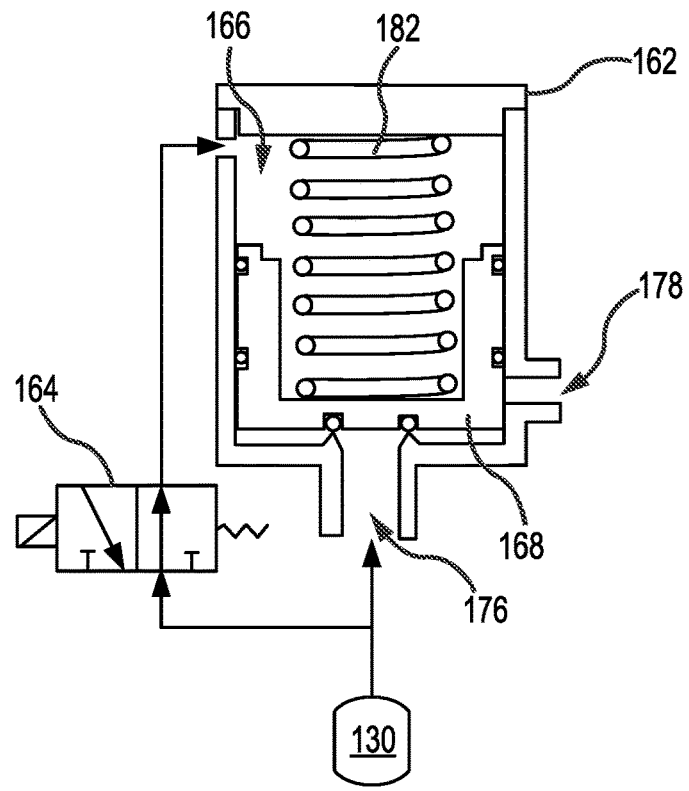
FIGS. 4A and 4B illustrate a schematic of pneumatic valve in a closed position and an open position, respectively, in accordance with various embodiments.
Figure 4B:
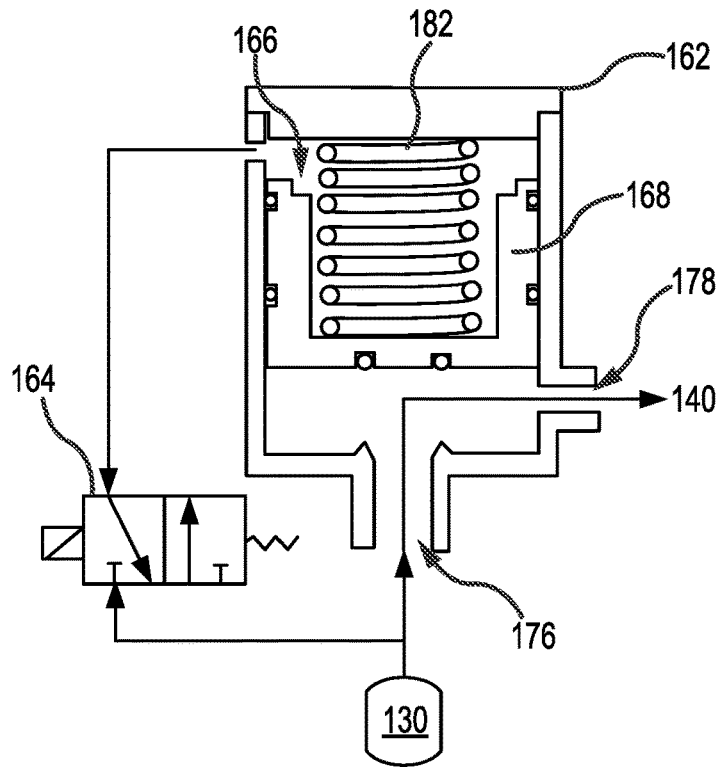

With reference to FIGS. 4A and 4B, additional details of control valve 164 and main pneumatic valve 162 are illustrated. In various embodiments, control valve 164 may be a normally open valve, such as, for example, a three-way, two-position normally open solenoid valve, and main pneumatic valve 162 may be a normally closed poppet valve. In this regard, energizing control valve 164 (i.e. providing electric current to control valve 164), as shown in FIG. 4B, opens the main pneumatic valve 162. De-energizing control valve 164 (i.e. stopping the flow of electric current to control valve 164), as shown in FIG. 4A, closes main pneumatic valve 162.

Referring to FIG. 4A, prior to deployment of the evacuation slide 120, control valve 164 is de-energized (i.e., no current is being supplied to control valve 164). In the de-energized state, control valve 164 is open and gas, from compressed fluid source 130, flows from control valve 164 into an upper chamber 166 of main pneumatic valve 162. The flow of gas into upper chamber 166 increases the pressure in upper chamber 166 and forces a poppet 168 of main pneumatic valve 162 toward an inlet 176 of main pneumatic valve 162. The pressure and/or force applied to poppet 168 locates poppet 168 in a position that blocks an outlet 178 of main pneumatic valve 162. Stated differently, the gas in upper chamber 166 forces main pneumatic valve 162 into a closed position. In the closed position, the flow of fluid between inlet 176 and outlet 178 of main pneumatic valve 162 is blocked by poppet 168. In various embodiments, main pneumatic valve 162 may also include a biasing member 182 located in upper chamber 166. Biasing member 182 is configured to apply a biasing force to poppet 168, thereby forcing poppet 168 toward inlet 176.

Referring to FIG. 4B, during deployment of evacuation slide 120, control valve 164 is energized (i.e., current is supplied to control valve 164). In the energized state, control valve 164 is closed such that gas, from compressed fluid source 130, flows to inlet 176 rather than upper chamber 166. The stoppage of gas flow into upper chamber 166 (e.g., by venting the high pressure fluid in the upper chamber 166) along with the increased flow into inlet 176 forces poppet 168 away from inlet 176. Stated differently, poppet 168 translates away from inlet 176 in response to the pressure applied to poppet 168 by the gas at inlet 176 exceeding the pressure in upper chamber 166 and the force applied by biasing member 182. Thus, when control valve 164 is energized, the gas provided through inlet 176 forces main pneumatic valve 162 into an open position. In the open position, poppet 168 is removed from outlet 178, thereby allowing gas, from compressed fluid source 130, to flow into inlet 176 and out outlet 178. Returning to FIG. 3, gas flowing out outlet 178 is provided to aspirator 140 and then inflatable tube 122.

Figure 5:
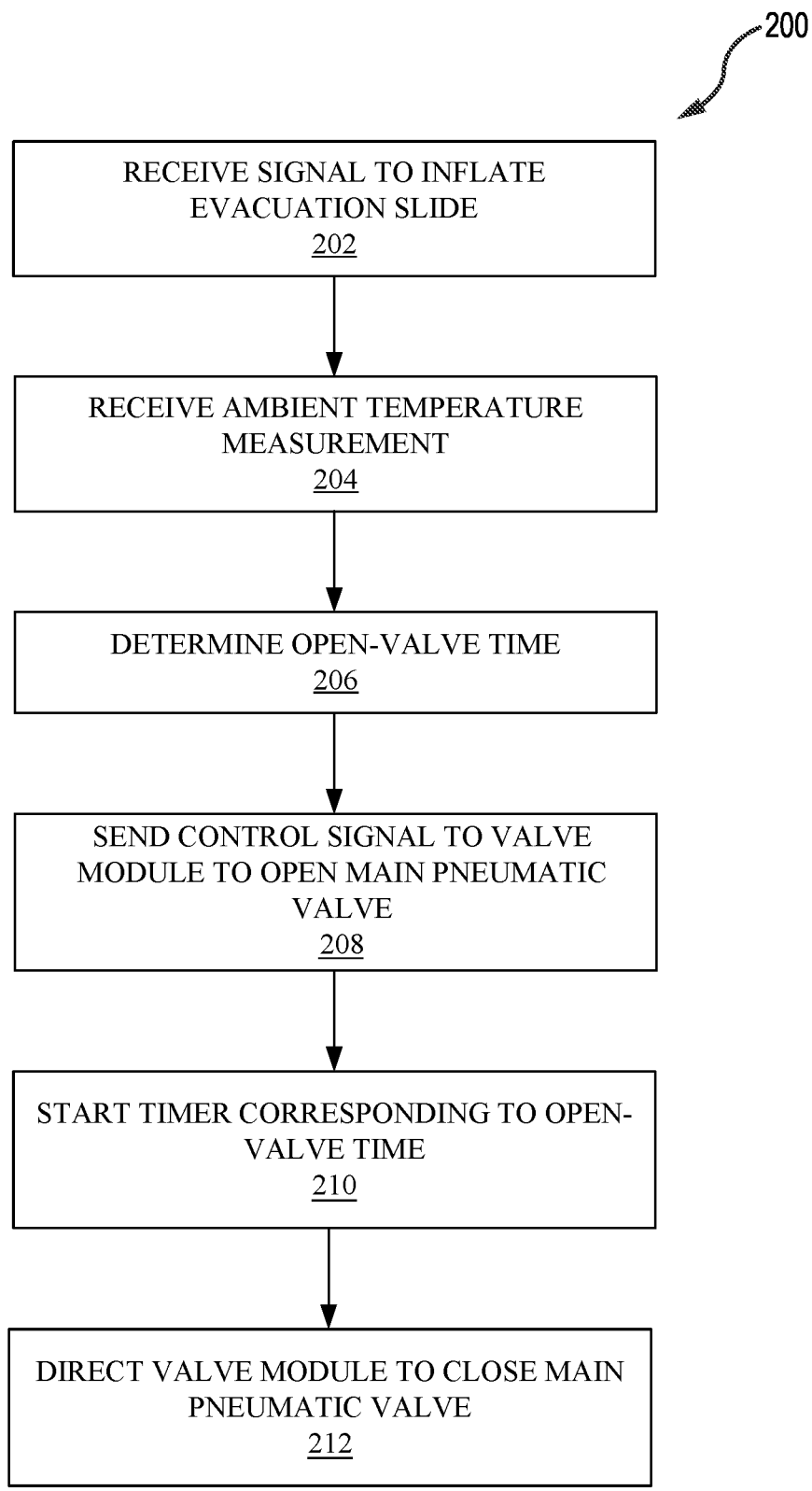
FIG. 5 illustrates a flowchart describing various steps employed during inflation of an evacuation slide, in accordance with various embodiments.

Referring now to FIG. 5, a method 200 for controlling inflation of an evacuation slide is provided. In describing the various steps of method 200, reference is made to the components of the inflation control system 150 described above with reference to FIG. 3. In accordance with various embodiments, method 200 includes controller 170 receiving a signal to begin inflation of the evacuation slide 120 (step 202). The signal to inflate the evacuation slide 120 may sent to controller 170 in response to deployment of evacuation system 106 (e.g., in response to exit door 104 being opened, a button being depressed, a lever being actuated, etc.).

Controller 170 then receives an ambient temperature measurement from temperature sensor 152 (step 204) and determines an open-valve time based on the ambient temperature measurement (step 206). As used herein, "open-valve time" refers to the duration of time that the valve module 160 (e.g., main pneumatic valve 162) is in the open position, whereby gas may flow from compressed fluid source 130 into inflatable tube 122. Controller 170 may determine the open-valve time by accessing an open-time versus temperature database 186. The open-time versus temperature database 186 includes a library of open-valve times (i.e., the duration of time that control valve 164 should be energized) associated with achieving a desired inflation pressure of evacuation slide 120 at particular ambient temperatures. For example, at a first ambient temperature, the open-valve time may be a first duration of time (e.g., 1.05 seconds) and at a second ambient temperature that is less than the first ambient temperature, the open-valve time may be a second duration of time that is greater than the first duration of time (e.g., 1.20 seconds).

Controller 170 then transmits a control signal to the valve module 160 to open the main pneumatic valve 162 (step 208). In various embodiments, opening the main pneumatic valve 162 is accomplished by energizing, and closing, the normally open control valve 164. Following opening the main pneumatic valve 162, the evacuation slide 120 begins to inflate. Controller 170 may set, or start, a timer corresponding to the open-valve time simultaneously, or nearly simultaneously, with transmitting the control signal to the valve module 160 (step 210). After the main pneumatic valve 162 has been open for the open-valve time, controller 170 directs valve module 160 to close the main pneumatic valve 162, thereby halting the flow of pressurized gas to the inflatable tube 122 (step 212). In various embodiments, controller 170 directs the main pneumatic valve 162 to close in response to expiration of the timer (e.g., in response to the timer reaching zero, or in response to the timer going from zero to the open-valve time). In various embodiments, closing the main pneumatic valve 162 is accomplished by de-energizing, and thus opening, control valve 164.

Figure 6:
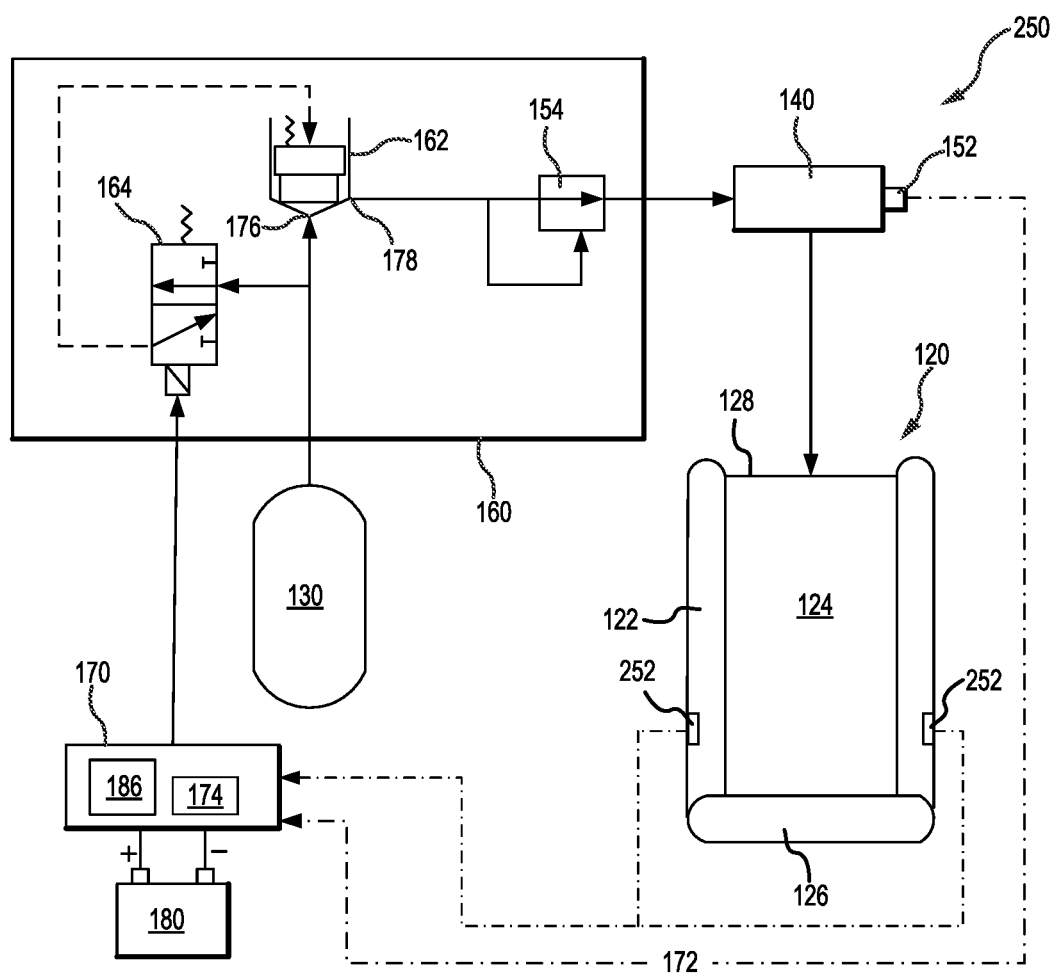
FIG. 6 illustrates a schematic of a ground-test inflation control system, in accordance with various embodiments.

With reference to FIG. 6, a ground-test inflation control system 250 is illustrated. Ground-test inflation control system 250 may be employed to create the open-time versus temperature database 186. In this regard, ground-test inflation control system 250 is employed to establish a relationship between the duration of time that main pneumatic valve 162 is in the open position and achieving a desired inflation pressure at different test temperatures (i.e., at temperatures likely to be encountered during an inflation process). Ground-test inflation control system 250 includes the components of inflation control system 150 along with one or more sensor(s) 252 configured to monitor the inflation of evacuation slide 120. Sensors 252 may be mounted on the inflatable tube 122. In various embodiments, sensors 252 may comprise pressure sensors configured to measure a pressure within inflatable tube 122. In various embodiments, sensors 252 may comprise stretch sensors configured to monitor an elastic stretch or an elastic deformation of the fabric that forms inflatable tube 122 during the inflation process. Real-time data correlating to the ambient temperature measured by temperature sensor 152 and real-time data correlating the elastic stretch (or pressure) experienced by the inflatable tube 122 may be sent to controller 170 during the inflation process.

Based on the ambient temperature data and the elastic stretch (or pressure) data, the duration of time the main pneumatic valve 162 needs to be open to achieve the desired inflation pressure at various temperatures may be determined. In this regard, the open-time versus temperature database 186 is developed and embedded into the controller 170 based on testing performed using ground-test inflation control system 250. The open-time versus temperature database 186 will generally include information defining a duration of time the main pneumatic valve 162 needs to open to achieve a desired inflation pressure at a given ambient temperature. In other words, the open-time versus temperature database 186 will enable the controller 170 to determine the open-valve time based on the ambient temperature measurement received from temperature sensor 152.

The inflation control system described above provides several benefits over existing systems. Existing inflation systems, for example, use pressure relief valves assembled to the inflatable. The current design eliminates hard spots on the fabric and potential sources of leakage from the inflatable tube in the regions of the pressure relief valves. Eliminating the pressure relief valves from inflatable also reduces the maintenance requirements. Further, once the open-valve time is achieved, the inflatable tube will have attained the desired pressure, and excess gas flow is halted by the controller at the source of the high-pressure gas (i.e., upstream from the inflatable). Stopping the excess gas flow from the upstream region of the inflatable facilitates increasing the inflatable operating pressure, which can allow for a reduction in tube diameter to achieve the same tube strength. This also enables a reduction in the effective packing volume of the inflatable tube and the quantity of fabric used to construct the inflatable tube.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed:

1. An inflation control system for an inflatable, comprising:
   a compressed fluid source;
   a valve module connected to the compressed fluid source and configured to control a flow of gas to the inflatable;
   a temperature sensor configured to measure an ambient temperature and output an ambient temperature measurement; and
   a controller operably coupled to the valve module, wherein the controller is configured to:
      receive the ambient temperature measurement;
      access an open-time versus temperature database; and
      determine an open-valve time based on the ambient temperature measurement by looking up the ambient temperature measurement in the open-time versus temperature database and determining the open-valve time associated with the ambient temperature measurement, the open-valve time being a duration of time the valve module is in an open position.

2. The inflation control system of claim 1, wherein the valve module includes a main pneumatic valve configured to start and to stop the flow of gas.

3. The inflation control system of claim 2, wherein the valve module includes a solenoid control valve operably coupled to the controller and configured to operate the main pneumatic valve, and wherein the controller is configured to energize the solenoid control valve for a length of time equal to the open-valve time.

4. The inflation control system of claim 3, wherein the solenoid control valve is a normally open valve.

5. The inflation control system of claim 3, wherein the valve module includes a pressure regulator valve.

6. The inflation control system of claim 1, further comprising an aspirator fluidly connected between the valve module and the inflatable, wherein the temperature sensor is mounted to the aspirator.

7. The inflation control system of claim 1, wherein the controller is further configured to:
   transmit a first control signal to the valve module to begin the flow of gas to the inflatable;
   start a timer corresponding to the open-valve time; and
   transmit a second control signal to halt the flow of gas to the inflatable.

8. An evacuation system for an aircraft, comprising:
   an inflatable tube;
   a compressed fluid source fluidly coupled to the inflatable tube;
   a valve module connected to the compressed fluid source and configured to control a flow of gas from the compressed fluid source to the inflatable tube;
   a temperature sensor configured to measure an ambient temperature and output an ambient temperature measurement; and
   a controller operably coupled to the valve module, wherein the controller is configured to:
      receive the ambient temperature measurement from the temperature sensor;
      access an open-time versus temperature database; and
      determine an open-valve time based on the ambient temperature measurement by looking up the ambient temperature measurement in the open-time versus temperature database and determining the open-valve time associated with the ambient temperature measurement, the open-valve time being a duration of time the valve module is in an open position.

9. The evacuation system of claim 8, wherein the valve module includes a main pneumatic valve configured to start and to stop the flow of gas from the compressed fluid source to the inflatable tube.

10. The evacuation system of claim 9, wherein the valve module includes a solenoid control valve operably coupled to the controller and configured to operate the main pneumatic valve.

11. The evacuation system of claim 10, wherein the controller is configured to energize the solenoid control valve for a length of time equal to the open-valve time.

12. The evacuation system of claim 11, wherein the solenoid control valve is a normally open valve.

13. The evacuation system of claim 11, wherein the controller is configured to start a timer corresponding to the open-valve time, and wherein the controller is configured to de-energize the solenoid control valve in response to expiration of the timer.

14. The evacuation system of claim 8, further comprising an aspirator fluidly connected between the valve module and the inflatable tube, wherein the temperature sensor is mounted to the aspirator.

15. The evacuation system of claim 8, wherein the controller is further configured to:
   transmit a first control signal to the valve module to begin the flow of gas to the inflatable tube;
   start a timer corresponding to the open-valve time; and
   transmit a second control signal to halt the flow of gas to the inflatable tube.

* * * * *